April 21. 1925.  
F. M. SCHULER  
STARCH CLEANING MACHINE  
Filed Dec. 31, 1923  
1,534,416  
2 Sheets-Sheet 2
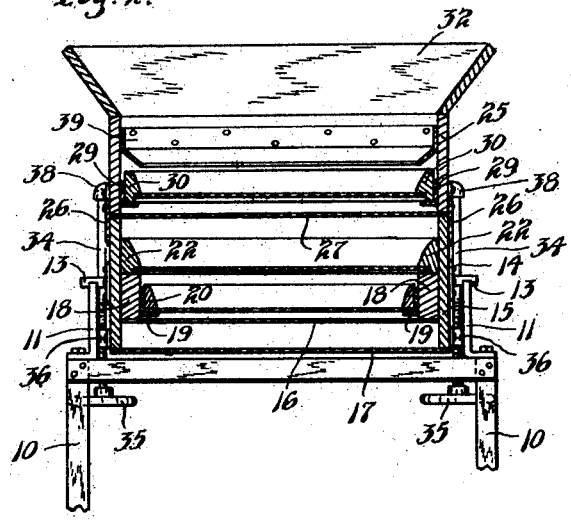
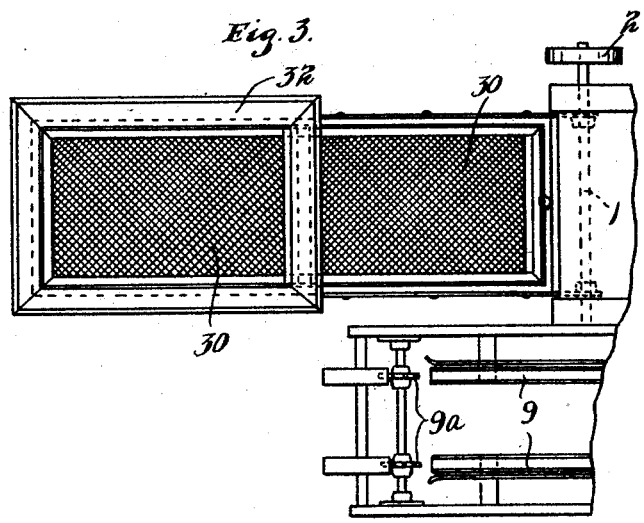
INVENTOR.  
FRANK M. SCHULER  
BY HIS ATTORNEY.

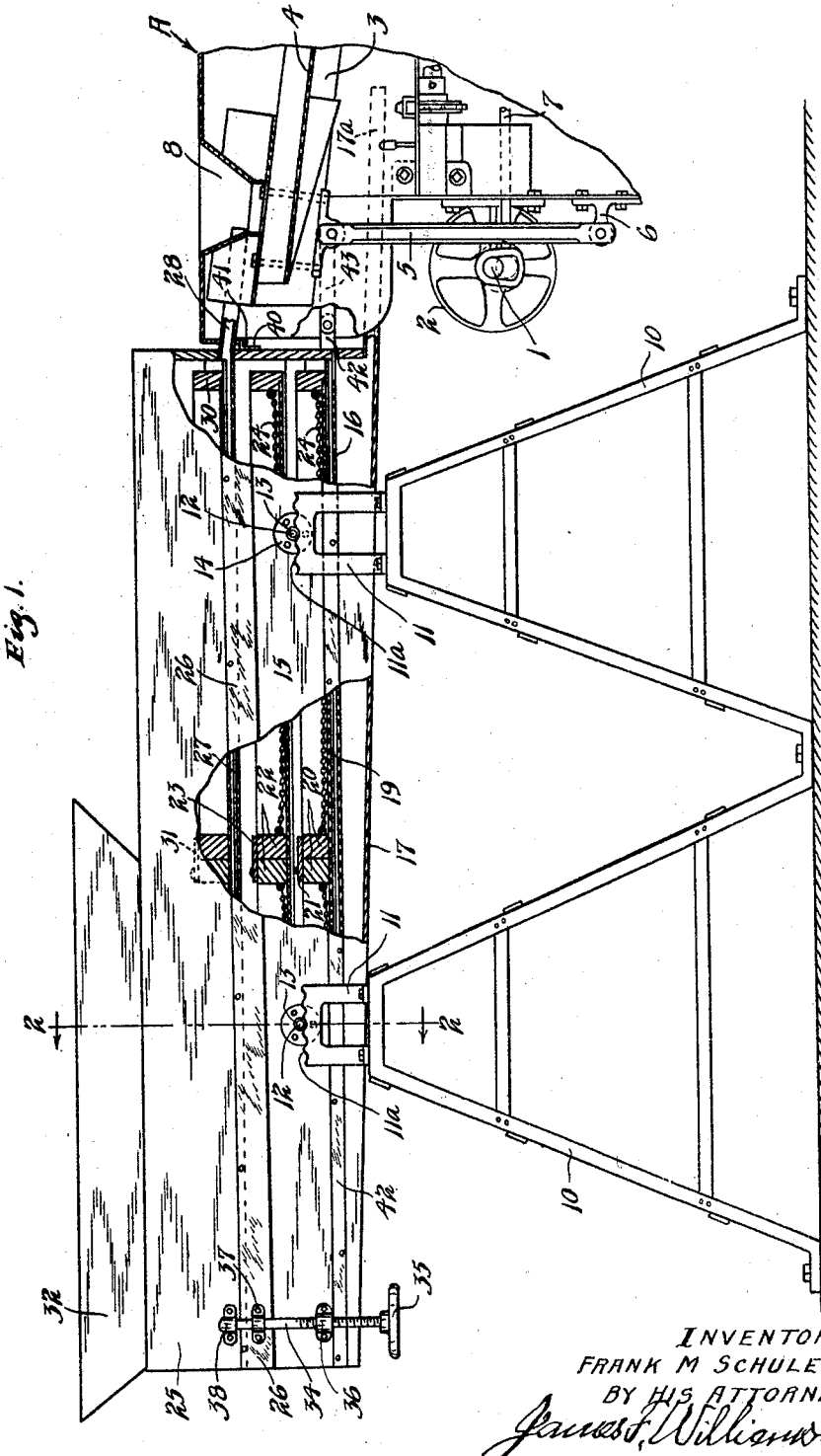

Patented Apr. 21, 1925.

1,534,416

UNITED STATES PATENT OFFICE.

FRANK M. SCHULER, OF WINONA, MINNESOTA.

STARCH-CLEANING MACHINE.

Application filed December 31, 1923. Serial No. 683,824.

*To all whom it may concern:*

Be it known that I, FRANK M. SCHULER, a citizen of the United States, residing at Winona, in the county of Winona and State of Minnesota, have invented certain new and useful Improvements in Starch-Cleaning Machines; and I do hereby declare the following to be a full, clear, and exact description of the invention, such as will enable others skilled in the art to which it appertains to make and use the same.

This invention relates to a machine for cleaning starch or for separating the starch from candy and then cleaning the starch. A great deal of candy is now made by machines in which the starch is used to form molds in which the candy material is deposited. The starch is usually contained in a mold board or frame and passes through the machine therein. After the candy has been deposited in the starch and hardened, the candy and starch has heretofore been dumped into a machine or portion of the candy machine where the candy and starch are separated, the starch being again used to fill the boards or mold frames. Such machines are commonly called "Starch Bucks". It has been the prior practice to continue to use such starch until it became so filled with lumps and foreign material that its use was impracticable. The starch was then taken from the machine and cleaned by a sieving process after which it was returned to the candy machine again to be used for a considerable period.

It is an object of this invention to provide a method and apparatus in which the starch is cleaned continuously and returned to the machine so that a clean supply of starch is always maintained in the candy machine. This machine is, in practice, provided with an automatic means for passing the mold boards or frames through the starch and filling the same so that they may be progressed through the machine and have the candy disposed therein.

It is also an object of this invention to provide a device arranged to be disposed adjacent the candy making machine into which device, the candy and starch may be dumped from the mold boards, which device will separate the candy and starch, returning the candy to the usual place in the candy machine and cleaning the starch and returning the same to the starch compartment in the standard machine.

It is a further object of the invention to provide such a device comprising a casing having a sieve bottom with a chute thereunder, which casing has mounted therein a plurality of superposed screens of different mesh arranged for longitudinal movement in said casing, together with means for reciprocating and vibrating said casing.

It is still another object of the invention to provide such a device and casing as above described, which casing has superposed thereon a second casing having a sieve bottom with a discharge chute at one end disposed above said sieve bottom and which second casing also has a plurality of sieves mounted therein for longitudinal movement relative thereto and which casing, preferably is provided with means for raising the same relative to the first mentioned casing at the end opposite its discharge chute.

It is still another object of the invention to provide such a device as described with means for reciprocating the same from the candy machine and means for supporting and vibrating the same.

These and other objects and advantages of the invention will be fully set forth in the following description made in connection with the accompanying drawings in which like reference characters refer to the same parts throughout the different views, and in which, Fig. 1 is a view in side elevation of the device, certain parts being broken away and others shown in vertical section, a portion of the candy machine also being shown;

Fig. 2 is a vertical section taken on the line 2—2 of Fig. 1, as indicated by the arrows; and Fig. 3 is a plan view of the device and portions of the candy machine adjacent the same, this view being shown on a reduced scale.

Referring to the drawings, one end of a standard candy making machine designated generally as A is illustrated which is commercially known as the "Simplex Starch Buck", which machine is adapted to separate the candy from the starch, to receive the empty mold boards and again fill them with starch, and progress the same to the candy depositor.

The only parts of said machine that it will be here necessary to consider are the crank shaft 1 having thereon the driving pulley 2, the vibrating frame 3 which carries a screen 4, which frame is supported by links 5 pivoted thereto, and the stationary supports 6 on the frame of said machine. The frame 3 is reciprocated by a pitman 7 connected to the crank shaft 1. The machine is adapted to receive the empty mold boards on tracks 9 shown in Fig. 3, the boards being carried along said tracks by a conveyor (not shown) operated by the sprockets 9ª. In the ordinary use of this machine, the candy and starch from the mold boards is dumped onto the screen 4 through a hopper 8, the starch passing therethrough and the candy being traversed along said screen to certain cleaning means. The operator then places the empty starch board in the machine on the tracks 9 and the same are carried along again to be filled.

In accordance with the present invention, supports 10 are provided which may be of any suitable frame structure which, in the embodiment of the invention illustrated, are shown as trapezoidal portions of a frame secured to the floor and carrying at their top portions plate brackets 11. The plate brackets 11 have upper surfaces 11ª of waved or corrugated contour. Resting upon the surfaces 11ª and supported thereby are rollers 12 secured to a casing 15. While the rollers may be supported in any suitable manner from said casing, in the embodiment of the invention illustrated, the same are shown as carried on short shafts 13 supported in flanged brackets 14 secured to the sides of casing 15. The casing 15, as illustrated, is substantially rectangular in form and is provided with a sieve bottom 16, which sieve will be of comparatively large mesh. While different sizes of mesh may be used, in practice, it has been found that a half inch mesh is very suitable. A floor 17 extends beneath the sieve 16 and inclines downwardly relative thereto, thus forming a chute having a discharge end or spout 17ª which is extended into the end of the machine A below the sieve 4 therein. The casing 15 has therein adjacent its sides, rectangular pieces 18, to the inner sides of which are secured angle members 19 which extend longitudinally thereof and which support a plurality of screens or screen frames 20. In the embodiment of the invention illustrated, two of these frames are shown and the aggregate length of the same is somewhat less than the length of the inside of the casing 15 so that said screens can slide longitudinally in the casing. A plate 21 is secured to the top of one of the ends of one screen 20 and extends over the adjacent end of the other screen, said plate extending entirely across said frames 20 so that a crack will not be open between said screens or sieves in their longitudinal movement. The members 18 support on their top surfaces a plurality of screens 22 extending between the sides of the casing 15 and which also have their aggregate length slightly less than the length of the inside of the casing 15. The adjacent ends of the screens 22 are also covered by a plate 23 secured to one of said screens and extending across the top of the other. The screens 20 and 22 have chains 24 resting thereon and secured to the screen frame to the ends thereof. Said chains are longer than the length of the screens so that they lie in slack condition on said screen. While the mesh of screens 20 and 22 may be considerably varied, in practice, it has been found that screen 20 operates efficiently with a forty-to-the-inch mesh, while screen 22 operates efficiently with a twenty-to-the-inch mesh.

Supported upon the casing 15 is a similar casing 25 having boards or cleats 26 at its sides extending downwardly along the side of casing 15. The casing 25 is also provided with a screen bottom 27 and has a discharge chute or spout 28 at one end disposed above said sieve bottom, which discharge chute projects into the end of machine A above the screen 4 thereof. The casing 25 has angle bars 29 at its inner sides a short distance above the sieve bottom 27 and a plurality of screens or screen frames 30 are longitudinally slidable thereon, said screens extending between said angle bars and having an aggregate length somewhat less than the inside length of casing 25. The adjacent ends of the screens 30 will also be provided with a plate 31 secured to one of said ends. The casing 25 has a hopper 32 adjacent one end and said casing is adapted to be raised at its end opposite the discharge chute 28 relative to the casing 15. For this purpose, a screw 34 is provided at each side of casing 25 having a hand wheel 35 at its lower end and extending through a nut bracket 36 secured to the side of casing 15. The screw extends through a guide bracket 37 on the cleat 26 and has its end projecting into a socket bracket 38 secured to the side of casing 25, the bracket 38 being closed at its top so that when said screw is elevated the casing 25 will be raised. The casing 25 also has an inner hopper or deflecting member 39 beneath hopper 32 adapted to direct material onto the screens 30. The casing 15 has an angle bracket 40 in one end having an apertured outstanding flange, into the aperture of which a pin 41 depending from spout 28 is received. Said casing 15 also has apertured arms 42 projecting from one end above the spout 17ª to which are pivoted links 43 having their other end pivoted to the frame 3 and preferably to the pivots at the upper end of links 5.

In the use of the present method and apparatus, the starch boards carry the candy and starch therein which are emptied into the hopper 32, the screens 30 at this time being removed. The starch passes through the sieve bottom 27 of casing 25, the candy is retained on said sieve bottom and discharged through the spout or chute 28 onto the screen 4 where it will pass, as usual, to the cleaning means of the machine A. The starch passes onto the screens 22 and the said screens are reciprocated longitudinally and vibrated vertically with the casing 15. It will be understood that the machine A is running, as is the shaft 1. The frame 3 therefore is reciprocated and the casing 15 will be reciprocated together with casing 25 through the links 43. As the casing 15 reciprocates, the rollers 13 move over the waved surfaces 11ª and the casing is therefore given a series of jolts or vertical vibrations. The sieves 20 and 22 will slide back and forth in casing 15 and bump against the ends thereof and the chains 24 will be thrown about on top of said screen so that the starch will efficiently be sieved therethrough. The starch passes through the coarser mesh screen 22 and then through the finer mesh screen 20 from which it falls onto the coarse screen 16 and passes therethrough, falling onto the floor or chute 17. The clean starch will pass down chute 17 and be discharged into the machine A through the spout 17ª below the screen 4. The starch is thus very efficiently sieved and screened and continuously delivered in clean condition to the machine A. All lumps and foreign matter in the starch are removed. Most of the lumps will be disintegrated on the sieves but any hard pieces which are not disintegrated, together with the foreign matter will remain on said sieves and may periodically be removed. The machine A being continuously provided with clean starch operates more efficiently in the candy making operation, the starch being continuously clean and in fine condition. The depressions made, therefore, in the candy molds are much more perfect than if the starch contained lumps and pieces of foreign matter. The necessity of periodically stopping the candy machine to clean out all of the starch and run the same through a starch cleaning apparatus is thus eliminated. The frame 25 will be elevated, if desired, to give the required speed of travel to the candy passing off of sieve bottom 27.

If it is desired to use the apparatus merely as a starch cleaner and not also as a candy separator, the screens 30 which preferably will be about one-quarter inch mesh, are placed in casing 25. The starch will then be sieved, the larger lumps and foreign matter remaining on the sieves 30. The sieves 30 are arranged quite close to the bottom sieve 27 so that a grinding action will be effected on the starch between said sieves. After the operator dumps the candy and starch into the hopper 32 he, as usual, places the empty mold board on the tracks 9 and he will be in convenient position for this operation.

From the above description it is seen that applicant has provided an efficient method and apparatus for continuously providing a supply of clean and fine starch to the candy making machine. It is apparent that the same has great utility and produces new and advantageous results, as well as eliminating a troublesome operation. It will be noted that the starch is not forced through the sieve by brushes as heretofore. The brushes force fine dirt through the sieves which pollutes the starch and cannot easily be separated therefrom.

It will, of course, be understood, that various changes may be made in the form, details, and arrangement of the apparatus and in the process without departing from the scope of applicant's invention, which, generally stated, consists in a device capable of carrying out the objects above stated, such as shown and described and set forth in the appended claims.

What is claimed is:

1. The combination with a starch buck having candy and starch sieving means therein, of a machine driven by said starch buck and having means for receiving candy and starch, means for separating the candy and starch, means for repeatedly sieving said starch and cleaning the same, and means for returning the starch to said starch buck.

2. The combination with a starch buck, of a starch cleaning device, means for driving the latter from the former, said starch cleaning device having means movable in two directions for sieving said starch, and means for returning the sieved starch to said buck.

3. A starch cleaning machine having in combination, a casing, an imperforate bottom therefor, a plurality of sieves in said casing above said bottom, means for supporting said sieves on which they are longitudinally movable, and means for simultaneously reciprocating said casing longitudinally and vertically.

4. A starch and candy separating and starch cleaning machine comprising a casing having a sieve bottom of comparatively large mesh, a chute beneath said bottom, a plurality of screens of much smaller mesh supported in said casing closely adjacent said bottom, said screens being arranged for longitudinal movement in said casing, a plurality of screens disposed in said casing for longitudinal movement thereof above said first mentioned screens and of larger mesh than the first mentioned screens, and means for longitudinally reciprocating said casing and screens.

5. A starch cleaning machine comprising a casing having a sieve bottom of comparatively large mesh, a plurality of sieves disposed in said casing closely adjacent said bottom and substantially in one plane, said sieves being arranged for longitudinal movement in said casing, a plurality of sieves disposed in said casing above said first mentioned sieves and of larger mesh than the same and also arranged for longitudinal movement in said casing, and a second casing supported on said first mentioned casing and having a sieve bottom of substantially the same mesh as said first mentioned sieve bottom.

6. A starch cleaning machine comprising a casing having a sieve bottom, a chute extending longitudinally beneath said bottom, means in said casing for supporting a plurality of sieves adjacent said bottom, said sieves being in substantially one plane and longitudinally movable in said casing, a plurality of sieves disposed in said casing above said last mentioned sieves and also disposed substantially in one plane and arranged for longitudinal movement in said casing, and means for reciprocating said casing and sieves.

7. The structure set forth in claim 6, and a casing disposed on top of said first mentioned casing having a sieve bottom, and means for raising one end of said last mentioned casing relative to said first mentioned casing.

8. A starch cleaning machine comprising a casing having a sieve bottom and a chute therebeneath, a plurality of vertically spaced and longitudinally reciprocable sieves in said casing, means for reciprocating said casing longitudinally, and means adjacent the front and rear of said casing for vibrating the same vertically.

9. The structure set forth in claim 8, a second casing resting on said first mentioned casing also having a sieve bottom and having a discharge chute at one end thereof above its sieve bottom.

10. The structure set forth in claim 3, and a sieve of larger mesh above said sieves extending substantially the full length of said casing, a chute at the end of said last mentioned sieve receiving material from the top thereof, and a chute at the same end of said bottom and receiving material therefrom.

11. A starch cleaning machine comprising superposed rectangular casings having sieve bottoms, a chute at one end of the upper casing above the sieve bottom thereof, a chute extending beneath the sieve bottom of the lower casing and having a discharge chute at one end disposed below the discharge chute of the upper casing, a plurality of superposed sieves supported in said lower casing for longitudinal movement relative thereto, means for raising the end of the upper casing opposite its discharge chute relative to the lower casing, and means for longitudinally reciprocating and vertically vibrating both casings.

12. A starch cleaning machine comprising a rectangular casing, a sieve bottom secured thereto, a plurality of sieves supported adjacent said bottom for sliding movement longitudinally of said casing, the aggregate length of said sieves being less than the inside length of said casing whereby said sieves may reciprocate in said casing, and means for imparting reciprocating movement to said casing and thus to said sieves.

13. The structure set forth in claim 12, and chains resting on said sieves and secured at the ends thereof, said chains being longer than the sieves so as to lie slack thereon.

14. The structure set forth in claim 12, and a plate covering the adjacent ends of said sieves and being secured to one of said ends.

15. The combination with a starch buck having a sieving means therefor and reciprocating means for said sieve, of a starch cleaning device having means for separating the candy and starch, means for delivering the candy to said sieving means of said buck, means for cleaning the starch, and means for continuously delivering the starch to said buck below the said sieving means therein, said device being operated from said buck.

16. The combination with a starch buck having a sieving means therein, of a starch cleaning means comprising a casing reciprocated from said starch buck having an imperforate bottom, a chute leading from said bottom into said starch buck below said sieving means, and a starch sieving means in said casing delivering sieved starch to said bottom and chute.

17. The structure set forth in claim 16, a comparatively large mesh sieve adjacent the top of said casing, and a chute leading from the top of said latter sieve into said starch buck above the sieving means therein.

18. A starch cleaning machine comprising a casing having an imperforate bottom therein, a plurality of sieves disposed substantially in one plane supported above said bottom for longitudinal movement in said casing, said sieves having an aggregate length less than the inside length of said casing, and means for reciprocating said casing whereby said sieves will be reciprocated against each other and the ends of said casing.

19. A starch cleaning machine comprising a casing having an imperforate bottom therein, a sieving means supported for longitudinal movement in said casing above said bottom and means for simultaneously reciprocating said casing longitudinally and vibrating the same vertically.

In testimony whereof I affix my signature.

FRANK M. SCHULER.